(12) United States Patent
Hilton

(10) Patent No.: US 7,508,747 B2
(45) Date of Patent: Mar. 24, 2009

(54) DERIVATIVE QUALIFIED ZERO CROSSING DETECTOR APPARATUS AND METHODS

(75) Inventor: Rick Hilton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1059 days.

(21) Appl. No.: 10/852,457

(22) Filed: May 24, 2004

(65) Prior Publication Data

US 2005/0268691 A1 Dec. 8, 2005

(51) Int. Cl.
*G11B 9/00* (2006.01)

(52) U.S. Cl. .................................... 369/126; 369/47.28

(58) Field of Classification Search ................. 369/101, 369/126
See application file for complete search history.

(56) References Cited

U.S. PATENT DOCUMENTS

| | | | | |
|---|---|---|---|---|
| 5,182,476 A | * | 1/1993 | Hanna et al. ................ | 327/362 |
| 5,361,175 A | * | 11/1994 | Richardson et al. ........... | 360/46 |
| 5,414,689 A | | 5/1995 | Maeda et al. | |
| 5,608,583 A | * | 3/1997 | Shrinkle ...................... | 360/46 |
| 7,301,886 B2 | * | 11/2007 | Hilton ......................... | 369/126 |

* cited by examiner

*Primary Examiner*—Wayne R Young
*Assistant Examiner*—Adam R Giesy

(57) ABSTRACT

Apparatus and methods are provided for detecting the presence of data in a recording media in a plurality of data locations. A mechanical detector is used to sense a data location and generate an initial signal. A differentiator is provided to differentiate the initial signal to generate a derivative signal. A comparator is used for comparing the derivative signal to a first reference signal to determine a zero crossing point representative of a change in direction of the detection device. At least one qualified signal is generated from the derivative signal. Timing circuitry is provided for comparing the zero crossing signal to the at least one qualified signal to determine the presence of data at a data location.

24 Claims, 6 Drawing Sheets

DERIVATIVE QUALIFIED ZERO CROSSING DETECTOR APPARATUS AND METHODS

FIELD OF THE INVENTION

The present invention relates generally to data storage and retrieval apparatus. In particular, the present invention relates to apparatus and methods for detecting data using derivative qualified zero crossings in a data detection system.

BACKGROUND

Electronic devices, such as palm computers, digital cameras and cellular telephones, are becoming more compact and miniature, even as they incorporate more sophisticated data processing and storage circuitry. Moreover, types of digital communication other than text are becoming much more common, such as video, audio and graphics, requiring massive amounts of data to convey the complex information inherent therein. These developments have created an enormous demand for new storage technologies that are capable of handling more complex data at a lower cost and in a much more compact package. Efforts are now underway to adapt technology to enable the storage of data on scale of nanometers to tens of nanometers, sometimes referred to as atomic resolution storage (ARS).

Several challenges arise in attempting to store data at the ARS level. On that scale, reading and writing data by electron beams or by mechanically detecting data pits on the recording media are increasingly delicate operations much more likely to be affected by error. Such data error can arise from stray electrons, atoms or molecules, extraneous noise and straying from the center of a data track.

In some prior art data recording and detection systems, data is written along recording tracks formed on the data-recording layer using data pits. A signal is detected having an amplitude representing the depth of data pits. If the probe tip passed through the center of the data pit, adequate detection could be achieved. However, any track offsets during detection caused the tip to pass over the edge of a pit, so that the amplitude was severely reduced. The result is poor data recovery error rates or extreme servo track following constraints on the system.

Some techniques have been developed in optical data disc systems to improve detection. In one such system, U.S. Pat. No. 5,414,689 (Maeda et al), a signal is generated and differentiated twice to find a zero crossing indicative of a pit characteristic. The first differentiated signal is utilized to qualify the zero crossing of the second order signal. Such a detecting system is too sensitive to low frequency noise found in an ARS system.

Data detection on the level of ARS technology require advanced but relatively simple techniques. The ARS data may be recorded by forming miniature pits or other types of data locations along extremely narrow and crowded multiple recording tracks. In ARS technology, the data storage and recording system is so small that it is very difficult to maintain a mechanical tracking device directly on the centers of the data pits or locations. For example, in such ARS systems, the interval between adjacent recording tracks may be 40-50 nm with only 5-7 nm of tracking error. The data pits or locations may be only about 10-20 nm deep and 35-40 nm in diameter and separated along the track by only a space of 35-40 nm. Thus, a reading that is even slightly off-track can result in inconclusive sensing.

The compact nature of ARS technology also leads to extreme noise problems. To promote precision at the ARS level, mechanical sensing probes may be used to ride along the surface of the recording media, in order to detect data pits or other types of data locations more readily. However, any discontinuities or uneven surface may cause substantial false pit sensing or "media noise." The presence of significant electronic and media noise along with a rapid fall-off of signal levels as the pits are read off-center of a track make ARS data recovery difficult in such a data detection system.

SUMMARY OF THE INVENTION

In one embodiment of the present invention, apparatus and methods are provided for detecting the presence of data in a recording media in a plurality of data locations. A mechanical detector is used to sense a data location and generate an initial signal. A differentiator is provided to differentiate the initial signal to generate a derivative signal. A first comparator is used for comparing the derivative signal to a first reference signal to determine a zero crossing signal representative of a change in direction of the detection device. A qualified signal is generated from the derivative signal. Timing circuitry is provided for comparing the zero crossing signal to the qualified signal to determine the presence of data.

DETAILED DESCRIPTION

Figure 1A:
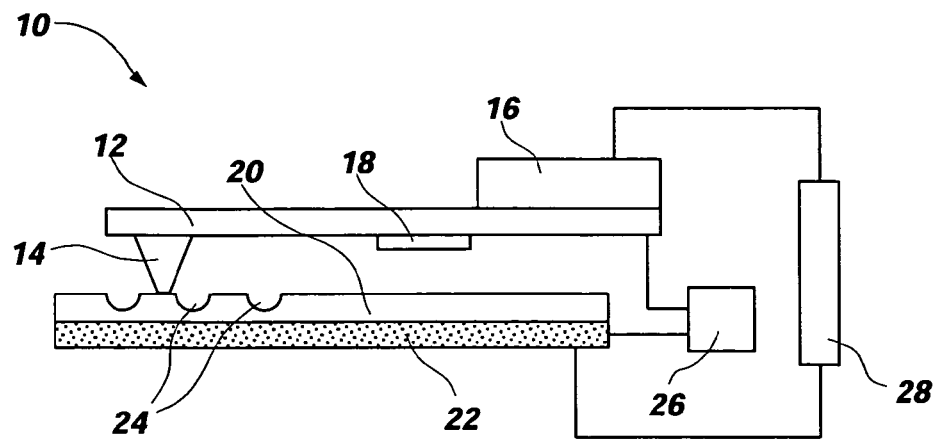
FIGS. 1A, 1B and 1C are simplified plan views of a cantilever-pit data detection system used in connection with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1B:
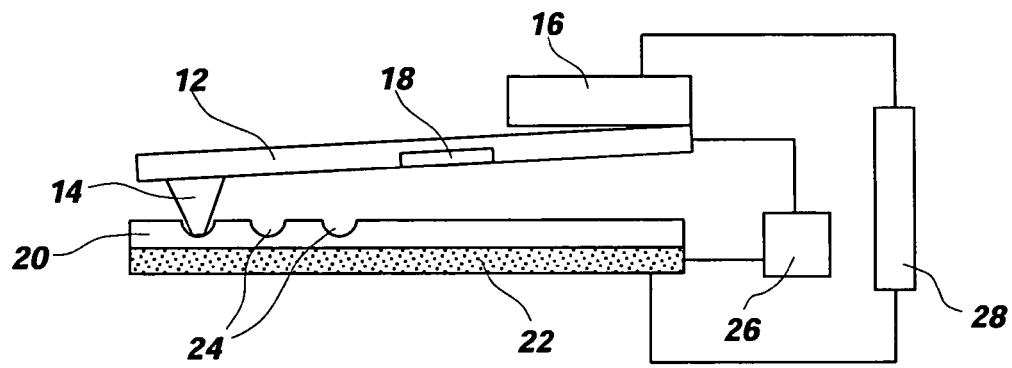
Figure 1C:
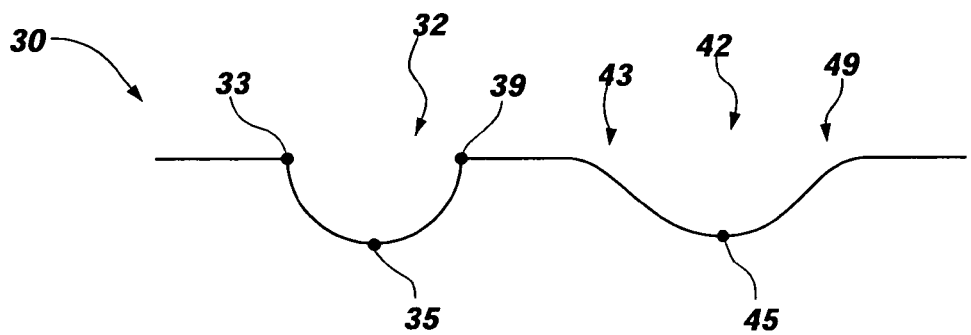

Looking first at FIGS. 1A, 1B and 1C, one embodiment of the present invention is shown, involving a cantilever data detection system 10 for detecting data pits. System 10 includes an elongated cantilever 12 having a pointed probe 14 and mounted on a silicon surface 16. A stress bar 18 is mounted on the underside of cantilever 12 to bias the cantilever downward. Cantilever 12 is poised above a recording media 20, mounted on a substrate 22 and having a plurality of data pits 24 therein. A translation drive circuit 26 is connected between the cantilever 12 and the substrate 22 to cause relative horizontal movement between the two elements, so that the cantilever can read multiple rows of data pits 24. Drive circuit 26 may be used to drive a micro-electrical mechanical (MEM) mover (not shown) commonly used in ARS data storage systems.

A sensing circuit 28 is connected between substrate 22 and silicon surface 16 for sensing the presence of data by movement of the cantilever 12. Sensing circuit 28 detects data pits 24 by generating a signal representative of the cantilever 12 detecting a data pit 24 by dropping into the pit 24, as shown in FIG. 1B. A sensing signal representative of the data pit 24 may be generated in a number of ways, including sensing a difference in electrical fields or a variation in resistivity of the cantilever 12.

Referring now to FIG. 1C, a close up view is shown of the data media 30. A data pit 32 is shown with characteristics to be capable of detecting data therefrom. A smoother indentation of similar depth 42 is also shown which does not qualify as a detectable data pit. In detecting data, the data pit signal is first generated and then differentiated to provide a zero crossing signal indicative of the cantilever being in the bottom of the data pit. However, false zero crossing signals may be generated by media and electronic noise and by variations in media depth, such as indentation 42. Accordingly, a strong negative signal is produced from the derivative signal representative of falling off the abrupt front edge 33 into data pit 32, and a strong positive signal is generated from the derivative signal representative of coming out of the pit at the abrupt rear edge 39 after the zero crossing point 35 at the bottom of pit 32.

Figure 4:
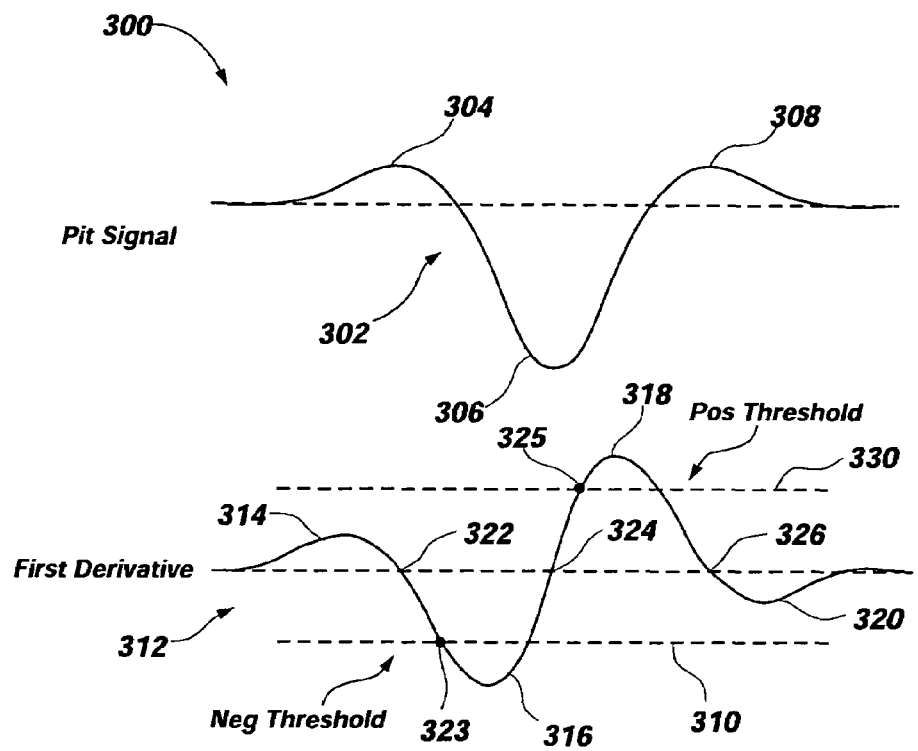
FIG. 4 is a diagram showing the waveforms provided by the embodiment of FIG. 2.

In order to qualify as a detectable data pit, the pit must have sufficiently abrupt edges to result in strong negative and/or positive derivative signals before and/or after the zero crossing representing the bottom of the pit, shown by the first derivative signal in FIG. 4. The negative and positive derivative signals must be tested to determine whether they have reached certain minimum thresholds to be qualified. At point 323, the negative derivative signal has reached the threshold level 310 so as to be a qualified negative derivative signal. Likewise, at point 325 the positive derivative signal has reached the threshold level 330 so as to be a qualified positive derivative signal. The presence of a negative qualified derivative signal prior to the zero crossing signal and/or a positive qualified derivative signal after the zero crossing signal can serve to authenticate the zero crossing signal as being indicative of a valid data pit.

Accordingly, smooth indentation 42 would not be abrupt enough to have detectable data. Referring again to FIG. 1C, there is a curved portion 43 at which the cantilever begins to drop into indentation 42, as well as a curved portion 49 at which the cantilever comes out of the indentation 42. Further, a zero crossing point 45 occurs at which the indentation 42 is at its maximum depth and begins to turn from negative to positive. The depth of the indentation 42 may be more or less than that of valid data pit 32. However, there are no abrupt edges causing strong negative derivative points or strong positive derivative points which exceed the threshold levels 310 and 330 in FIG. 4, so no negative or positive qualified signals will be generated by the system. Accordingly, the present system will determine that indentation 42 is not a detectable data pit and move on.

Figure 2:
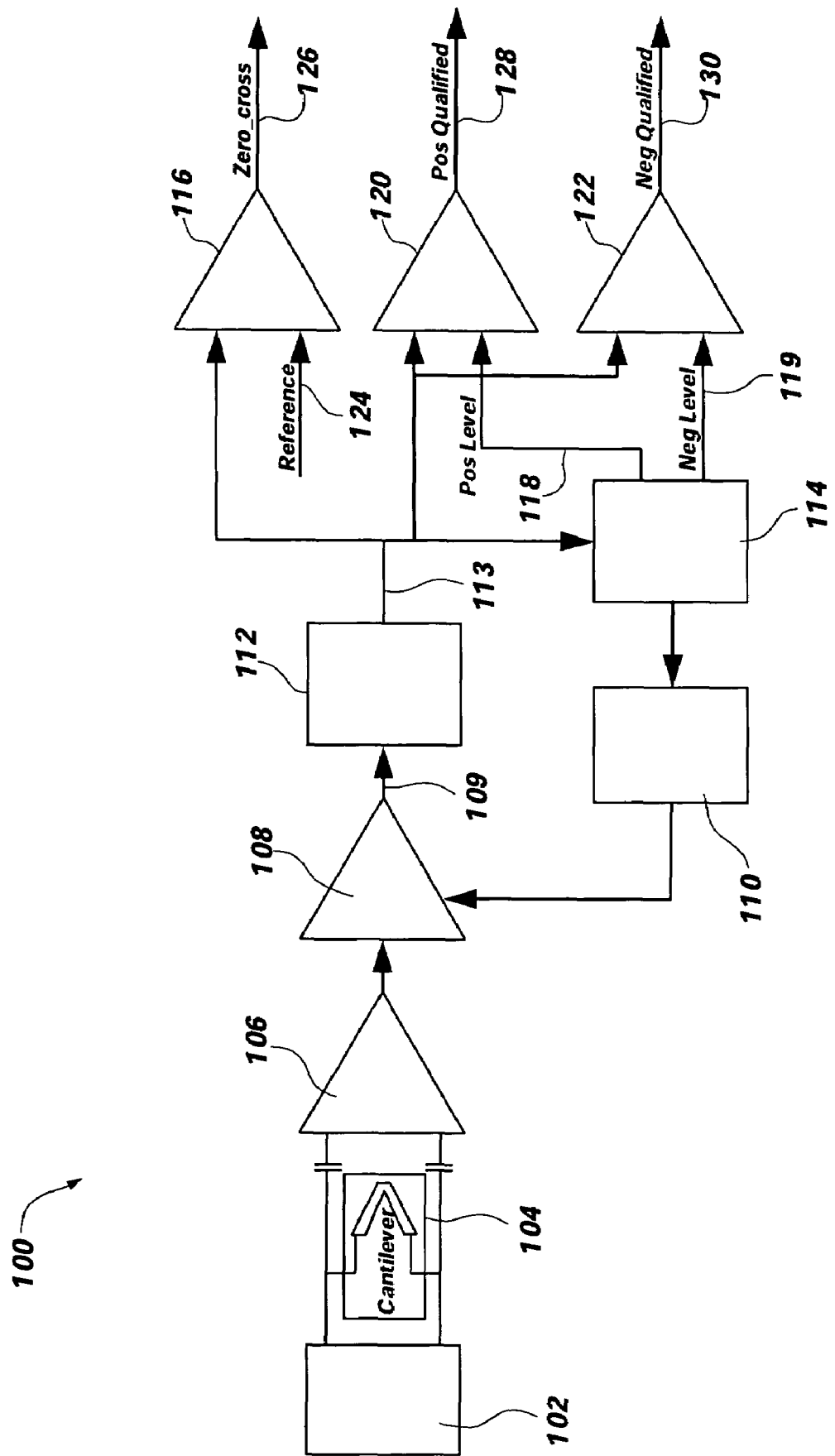
FIG. 2 is a circuit block diagram according to one embodiment of the present invention.

Looking now at FIG. 2, a block diagram is shown of a circuit 100 for detecting data in a data recording system according to an embodiment of the present invention. A read driver 102 is connected to cantilever 104 for biasing the cantilever. Typically the cantilever 104 rides along the surface of recording media, as shown in FIG. 1. The data pits may be aligned along a data track in the media, so that, as the cantilever 104 moves along the track, it drops into each pit.

The cantilever signal is A-C coupled to a sense amplifier 106 having a derivative circuit therein (not shown). A variable gain amplifier 108 is connected to sense amplifier 106 and includes an automatic gain control circuit 110 in a feedback loop to amplifier 108. The output 109 of variable gain amplifier 108 feeds to a bandpass filter 112 to screen out undesirable noise.

The output signal 113 of filter 112 is connected to an amplitude detection device 114 and to inputs of a first comparator 116, a second comparator 120 and a third comparator 122. The amplitude detector device 114 provides a positive signal 118 and a negative signal 119 to second comparator 120 and third comparator 122, respectively. A reference signal 124 is input into first comparator 116 together with the output signal 113. Comparator 116 provides a zero crossing output signal 126. Comparator 120 gives a positive qualified signal 128, and comparator 122 provides a negative qualified signal 130.

Figure 3:
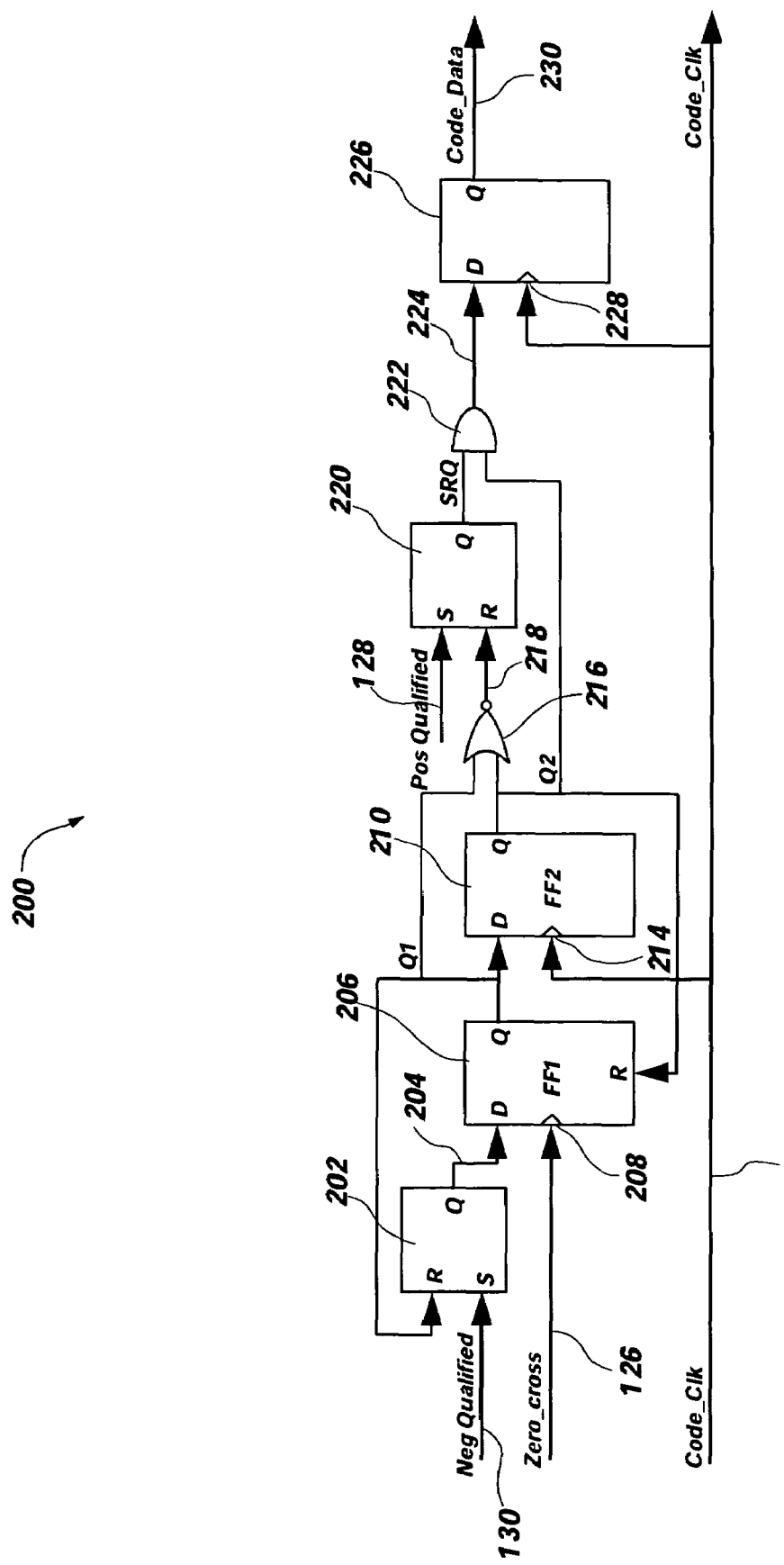
FIG. 3 is a logic block diagram according to the embodiment of the present invention complimenting the circuit block diagram shown in FIG. 2.

Referring now to FIG. 3, a logic diagram 200 for detection data is shown. The set input S of an R-S flip-flop circuit 202 comes from the negative qualified signal 130. The Q output 204 from flip-flop circuit 202 feeds to the input D of flip-flop circuit 206. The zero crossing signal 126 feeds into the clock input 208 of flip-flop circuit 206. The Q output signal Q1 of flip-flop circuit 206 feeds back to the reset input R of flip-flop circuit 202.

The Q1 output signal also feeds into the input D of flip-flop circuit 210. A clock signal 212 feeds into the clock input 214 of flip-flop circuit 210. The flip-flop circuit 210 has an output signal Q2 that feeds back into the reset input R of flip-flop 206. The output signal Q2 also serves as one input of a NOR gate 216 and the output signal Q1 is the other input. The output of NOR gate 216 is signal 218 that feeds into the reset input R of a flip-flop circuit 220. The positive qualified signal 128 feeds into the set input S of flip-flop circuit 220. The output signal SRQ of flip-flop circuit 220, together with the Q2 output signal feed into an AND gate 222. The output signal 224 feeds into a D input of a flip-flop circuit 226. The Q output 230 provides data pulses that are synchronized by a clock pulse on the clock input 228 of flip-flop circuit 226.

Referring again to FIG. 4, a diagram 300 shows certain waveforms 302 and 312 representative of the operation of circuit 100 in FIG. 2. Waveform 302 is a pit sense signal produced by cantilever 104 and representative of detecting a data pit (not shown). An upward rise 304 is representative of a media bulge just prior to an edge of the data pit. The deep trough 306 is representative of the pit depth, followed by another rise 308, again representing a media bulge of material from the data pit.

Waveform 312 in FIG. 4 represents a derivative signal provided by sense amplifier 106 in FIG. 2. A small positive rise 314 is followed by a negative trough 316, a positive large rise 318 and a small negative trough 320. The zero crossings in waveform 312 correspond to the zero crossing output 126 in FIG. 2. A first zero crossing point 322 corresponds to the peak of rise 304 of pit signal 302 in FIG. 4. A second zero crossing point 324 is representative of the trough 306 of pit signal 302 in FIG. 4. A third zero crossing point 326 is representative of the small rise 308 of pit signal 302 in FIG. 4. A positive threshold 330 is representative of the positive qualified signal 128 in FIG. 2. A negative threshold 310 is representative of the negative qualified signal 130 in FIG. 2.

Figure 5:
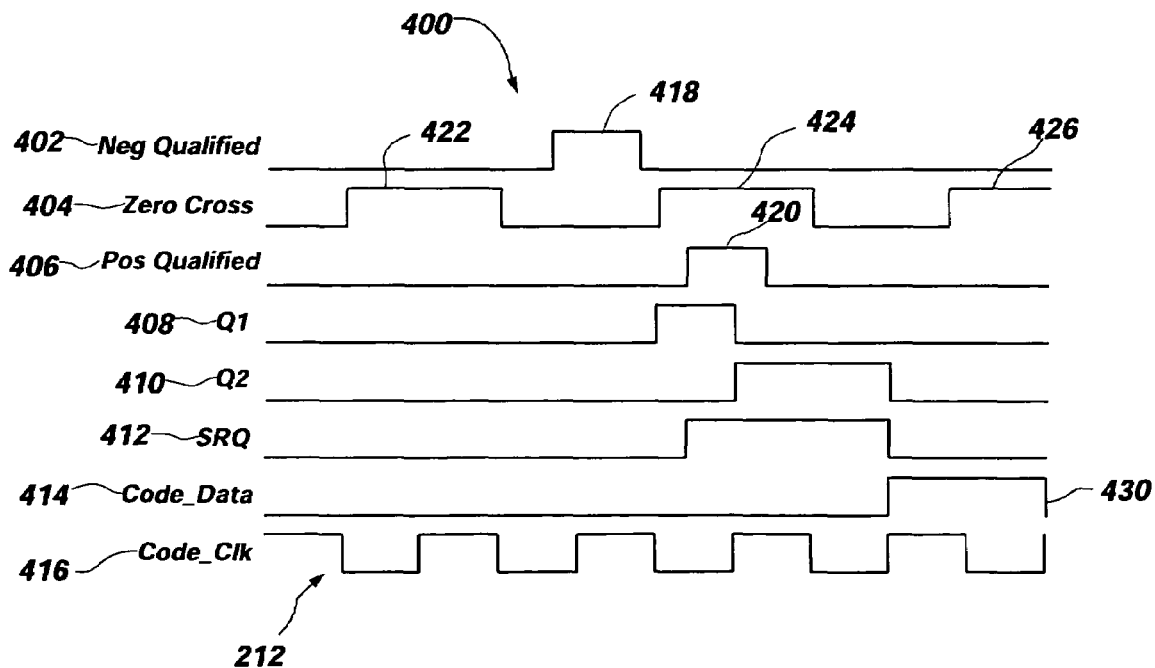
FIG. 5 is a timing diagram showing the pulses generated by the embodiment shown in FIG. 3.

Referring now to FIG. 5, a timing diagram 400 is shown, representative of operation of logic circuit 200 and the input and output signals of the logic diagram shown in FIG. 3. Looking first at the zero crossing pulse line 404, the edges of pulses 422, 424 and 426 represent the zero crossings of the derivative signal 312 including zero crossings 322, 324 and 326, shown in FIG. 4. The negative and positive qualified pulses 418 and 420 represent the trough 316 and large rise 318, respectively, in FIG. 4. On lines 408, 410 and 412, pulses Q1, Q2 and SRQ represent outputs in FIG. 4 of the same name. The code data pulse 430 in code data line 414 represents the code data output signal 230 in FIG. 3. Finally, the clock pulses along code clock line 416 represents the code clocks 212 in FIG. 3.

Looking at FIGS. 3, 4 and 5 together, when the negative qualified signal 130 on the set input S of flip-flop circuit 202 goes high representing the presence of negative trough 316, the output signal 204 goes high. Signal 204 feeds to flip-flop circuit 206 which has a Q1 output signal only when a zero crossing signal 126 is received, in addition to the high output signal 204. Thus, the Q1 signal only goes high when there is a negative qualified signal followed by a zero crossing signal, as shown by pulses 418 and 424. This status is representative, in FIG. 4, of the trough 306 of pit signal 302, as well as the zero crossing 324 of derivative waveform 312. The Q1 signal also feeds back to reset flip-flop circuit 202 for the next negative qualified signal.

In a similar fashion, the outputs Q1 and Q2 from flip-flop circuits 206 and 210, respectively, feed a NOR gate 216 having a reset output to flip-flop circuit 220. The NOR gate 216 will reset flip-flop circuit 220 off until a new negative qualified signal generates a new Q1 signal. In the meantime, if a positive qualified signal 128 appears at the set input S of flip-flop circuit 220 with Q1 high, then an output signal SRQ is generated.

Note that the Q2 signal has been synchronized by the clock signal at input 214 of flip-flop circuit 210. Thus, the output signal SRQ of flip-flop circuit 220 stays high until Q2 goes low, thereby synchronizing the trailing edge of the SRQ signal. The output signal 224 of AND gate 222 goes high only when the Q2 and SRQ signals both go high, which starts the data signal. Finally at flip-flop circuit 226, the leading edge of the data pulse 430 is synchronized with the clock pulses because of the clock input to clock input 228.

Thus, there is an output data signal 430 only at the occurrence of a positive qualified signal 128 after a zero crossing signal 126 which followed a negative qualified signal 130. In other words, the logic circuitry 200 in FIG. 3 only yields a data pulse output if a negative qualified pulse occurs (dropping abruptly off the edge of the pit), followed by a zero crossing signal (traversing the bottom of the pit), followed by a positive qualified pulse (rising abruptly out of the other end of the pit.)

It should be understood that the method and system of the present invention may be used to sense data storage systems using data storage means other than data pits. For example, magnetic or light/optical data storage media may be used to store data. In such cases, a negative qualified signal might be generated when a beginning of a data storage position is located, indicating a beginning of a change in magnetic or light-related characteristics. A zero crossing signal might be generated when the new data storage has been fully encountered, indicating a new state of magnetic or light/optical characteristics. Finally, a positive qualified signal might be generated when an end of the storage position is encountered, indicating an ending of a change in magnetic or light-related characteristics. Negative and positive qualified signals might be generated if the change in magnetic or optical characteristics exceeds a certain threshold.

In such systems, just as in a data pit system, the system of the present invention may be applied to develop a derivative signal indicative of a zero crossing point and negative and positive qualified signals to indicate that a minimum threshold has been reached. Thus, the system of the present invention is effective in sensing data changes for any type of data location.

Figure 6A:
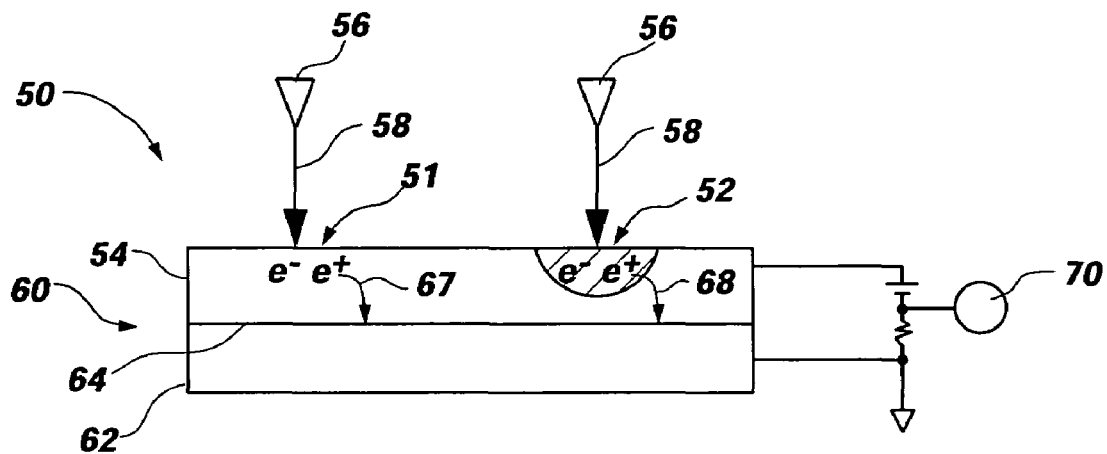
FIGS. 6A and 6B are simplified plan views of an electro-optical data detection system used in connection with the present invention.
Figure 6B:
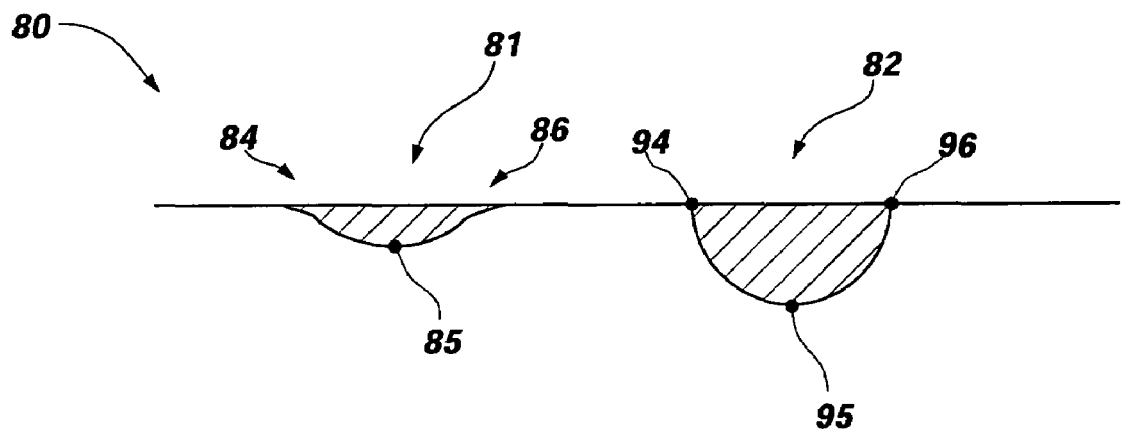

For example, FIGS. 6A and 6B show an ARS data storage system 50 in which data may be stored by optical or electron beams acting on a medium to change the state of the medium. An example of such a system using electron beams is shown in U.S. Pat. No. 5,557,596 (Gibson, et al).

As shown in FIG. 6A, energy beam generators 56 direct energy beams 58, such as electrons or photons, to the data locations 51 and 52 in media layer 54. When the energy beams 58 are at high energy they may change the state of data locations 52 to represent a change in data. In one embodiment, if no change has occurred to the media state at location 51, it might be construed to be a "0" and if a change has occurred in the media state at location 52, it might be considered to be a "1". At a lower energy level, beams 58 may be used to read the state of the media at the data locations 51 and 52. Reading or detecting can take place in several ways. As shown in FIG. 6A, a diode 60 is formed by a semiconductor layer 62 adjacent to the storage media layer 54, providing a diode junction 64 between media layer 54 and semiconductor layer 62. In this example, a certain number of carriers 67 from data location 51 will be swept across the diode junction 64 and detected by detector 70. Likewise, a different number of carriers 68 from data location 52 will be swept across diode junction 64 and detected by detector 70. The difference in carriers 67 and 68 will indicate the state of data locations 51 and 52 and therefore detect whether there is a "0" or a "1" at those locations.

In the example of FIG. 6A, the system of the present invention may likewise be applied to achieve improved results over the prior art. In such case, a data location signal and corresponding derivative signal may be generated, corresponding to those shown in FIG. 4. Likewise, zero crossing, negative and positive signals may be generated to correspond with those shown in FIG. 5. As before, the zero crossing signal represents a change in state of data in the data location, a negative signal represents encountering the beginning of a data location, and a positive signal represents encountering the end of a data location. Negative and positive qualified signals indicate whether a qualified data location has been found by whether a threshold has been reached. Alternately, at a given data location, if positive and/or negative qualified signals are detected, a first data state, such as a "1", might be detected. If positive and/or negative qualified signals are not detected, a second data state, such as a "0", might be detected.

FIG. 6B shows a media state representation 80 of FIG. 6A, in which data location 81 has a first media state and data location 82 has a second media state. Data locations 81 and 82 might correspond to data locations 51 and 52 in FIG. 6A. Alternately, data location 81 might considered to be a false data point, caused by media noise or defects, and data location 82 might be a true data point. Data location 81 includes a curved portion 84 at which the beginning of some media change may be detected, and a curved portion 86, at which the end of the media change may be detected. Between those points, a zero crossing point 85 might be detected, at which the media change might be the strongest. However, the derivative signals (not shown) at the curved portion 84 and the curved portion 86 are not of sufficient strength to reach a minimum threshold level. Accordingly, negative qualified and positive qualified signals are not generated.

Looking at data location 82, negative and positive points 94 and 96 are shown, at the points where the media change abruptly begins and ends. Also zero crossing point 95 is found, where the media change is the strongest. The abrupt changes in charge at points 94 and 96 result in strong derivative signals (not shown) that are above a minimum threshold. Accordingly, the presence of the zero crossing point 95 and either or both of the negative qualified derivative signal and positive qualified signal are sufficient to indicate that data has been detected, or alternately that a certain data state, such as a "1" has been detected.

Figure 7:
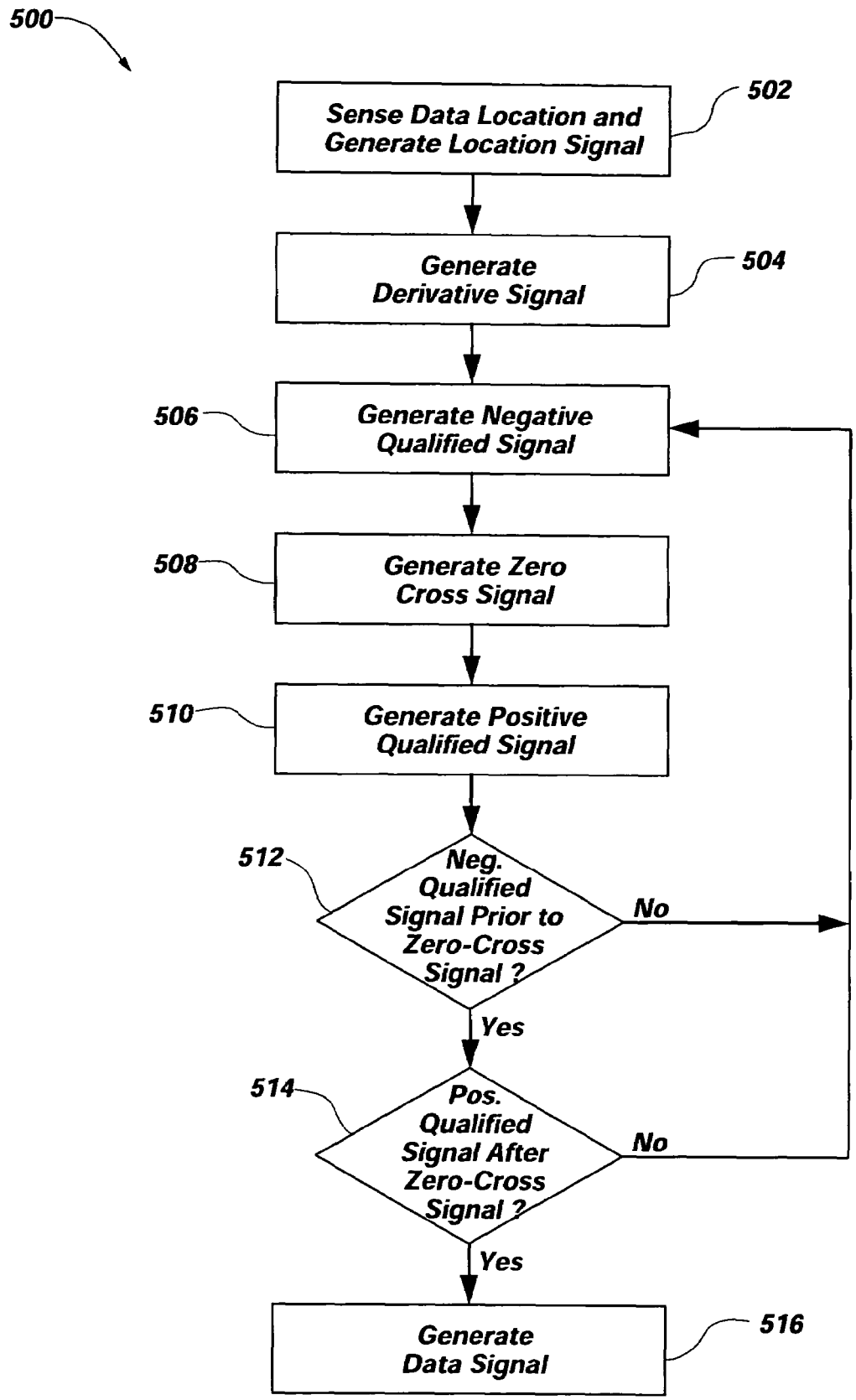
FIG. 7 is a flow diagram showing a method according to the embodiment of FIGS. 2-3.

FIG. 7 shows a flow diagram of the data detection method 500 described above, in which data pits are generalized to any type of data locations. Reference is also made to the circuitry in FIG. 2 and the waveforms in FIG. 4 with respect to the reference number associated with the steps in FIG. 7. At step 502, the cantilever 104 senses the data location and generates a data location signal 302. At step 504, the sense amplifier 106 generates a derivative signal 312. Then at step 506, a negative qualified signal 126 is generated. At steps 508 and 510, a zero crossing signal 130 and a positive qualified signal 128 are generated.

At decision step 512 a determination is made as to whether a negative qualified signal 130 was generated prior to the zero crossing signal 126. If not, the process returns to step 506 to generate a new zero crossing signal 126. If the answer is yes, the method proceeds to step 514 where a determination is made as to whether a positive qualified signal 128 was generated after the zero crossing signal 126. If the answer is no, the process returns to step 506 to generate a new zero crossing signal 126. If the answer is yes, a data signal is generated at step 516.

It is apparent that the other sensing systems, such as an optical or magnetic detection systems, may be used in place of the cantilever system disclosed herein. Likewise, a separate generating element besides the sense amplifier may be used to generate a derivative signal. In addition, other circuitry besides comparators may provide the zero crossing signal and the negative and positive qualified signals. In addition, other logic elements may be substituted for or used in addition to those shown to achieve the same result.

It should also be understood that the occurrence of either the negative qualified signal or the positive qualified signal, together with the zero crossing signal, may be sufficient to signify detection of a data pit. In such case, the circuitry of FIG. 3 and the timing diagram of FIG. 5 may be simplified accordingly.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus for detecting the presence of data in a recording media in a plurality of data locations, comprising:
   (a) a detector associated with the plurality of data locations for sensing one of the data locations and generating an initial signal;
   (b) a differentiator in electrical communication with the detector for differentiating the initial signal to generate a derivative signal;
   (c) a first comparator in electrical communication with the differentiator for comparing the derivative signal to a reference signal to determine a zero crossing signal representative of a change in direction of the initial signal;
   (d) a qualifying circuit in communication with the differentiator for generating a qualified signal from the derivative signal, wherein the qualifying circuit includes an amplitude detector and comparators for generating a positive qualified signal and a negative qualified signal from the derivative signal; and
   (e) timing circuitry in electrical communication with the first comparator and the qualifying circuit operable to output a data signal only at the occurrence of the negative qualified signal followed by the zero crossing signal followed by the positive qualified signal.

2. The apparatus of claim 1, wherein the timing circuitry includes digital circuitry for comparing a timing point of the zero crossing signal to a timing point of the negative qualified signal to determine the presence of data.

3. The apparatus of claim 2, wherein the digital circuitry detects the occurrence of the negative qualified signal prior to the occurrence of the zero crossing signal, in order to determine the presence of data.

4. The apparatus of claim 1, wherein the timing circuitry includes second digital circuitry for comparing a timing point of the zero crossing signal to a timing point of the positive qualified signal to determine the presence of data.

5. The apparatus of claim 4, wherein the timing circuitry detects the occurrence of a positive qualified signal after the occurrence of the zero crossing signal, in order to determine the presence of data.

6. The apparatus of claim 1, further comprising a second comparator associated with the amplitude detector to determine a positive qualified signal and a third comparator associated with the amplitude detector to determine a negative qualified signal.

7. The apparatus of claim 6, wherein the timing circuitry comprises first digital circuitry, for comparing a timing point of the negative qualified signal to a timing point of the zero crossing signal, and second digital circuitry for comparing a timing point of the positive qualified signal to a timing point of the zero crossing signal to determine the presence of data.

8. The apparatus of claim 1, wherein the data locations comprise data pits.

9. A method for detecting the presence of data in a recording media in a plurality of data locations, comprising:
   (a) sensing one of the data locations and generating an initial signal representative of said one data location,
   (b) differentiating the initial signal to generate a derivative signal,
   (c) comparing the derivative signal to a first reference signal to generate a zero crossing signal,
   (d) generating a positive qualified signal and a negative qualified signal from the derivative signal; and
   (e) comparing the timing of the zero crossing signal to the timing of the positive and negative qualified signals to determine the presence of data.

10. The method of claim 9, wherein the timing comparison step comprises comparing a timing point of the zero crossing signal to a timing point of the negative qualified signal to determine the presence of data.

11. The method of claim 10, wherein the timing comparison step comprises detecting the occurrence of a negative qualified signal prior to the occurrence of the zero crossing signal, in order to determine the presence of data.

12. The method of claim 9, wherein the timing comparison step comprises comparing a timing point of the zero crossing signal to a timing point of the positive qualified signal to determine the presence of data.

13. The method of claim 12, wherein the timing comparison step comprises detecting the occurrence of a positive qualified signal after the occurrence of the zero crossing signal, in order to determine the presence of data.

14. The method of claim 9, wherein the timing comparison step comprises detecting the occurrence of a negative qualified signal prior to the occurrence of the zero crossing signal and detecting the occurrence of a positive qualified signal after the occurrence of the zero crossing signal, in order to determine the presence of data.

15. The method of claim 9, further comprising comparing the derivative signal to a second reference signal to determine a positive qualified signal and comparing the derivative signal to a third reference signal to determine a negative qualified signal.

16. The method of claim 15, further comprising comparing a timing point of the negative qualified signal and a timing point of the positive qualified signal to a timing point of the derivative signal to determine the presence of data.

17. The method of claim 9, wherein the data locations comprise data pits.

18. The method of claim 9, wherein the data locations are magnetic or optical sites.

19. A method for detecting the presence of data in a recording media in a plurality of data locations, comprising:

(a) sensing one of the data locations and generating an initial signal, (b) differentiating the initial signal to generate a derivative signal, (c) comparing the derivative signal to a first reference signal to determine a zero crossing signal, (d) generating a negative qualified signal and a positive qualified signal, (e) comparing a timing point of the zero crossing signal to a timing point of the negative qualified signal and to a timing point of the positive qualified signal to determine the presence of data.

20. The method of claim 19, wherein the data locations comprise data pits.

21. The method of claim 20, wherein the sensing step is conducted by a cantilever detector with a probe for mechanically engaging the data pits.

22. The method of claim 20, wherein the differentiating step is conducted by a sense amplifier.

23. The method of claim 20, wherein the comparing of a timing point step comprises determining when the negative qualified signal occurs before the zero crossing signal.

24. The method of claim 20, wherein the comparing of a timing point step comprises determining when the positive qualified signal occurs after the zero crossing signal.

\* \* \* \* \*

UNITED STATES PATENT AND TRADEMARK OFFICE
CERTIFICATE OF CORRECTION

| | | |
|---|---|---|
| PATENT NO. | : 7,508,747 B2 | Page 1 of 1 |
| APPLICATION NO. | : 10/852457 | |
| DATED | : March 24, 2009 | |
| INVENTOR(S) | : Richard L. Hilton | |

It is certified that error appears in the above-identified patent and that said Letters Patent is hereby corrected as shown below:

On the title page, item (75), in "Inventor", in column 1, line 1, delete "Rick" and insert -- Richard L. --, therefor.

Signed and Sealed this

Twenty-eighth Day of July, 2009

JOHN DOLL
*Acting Director of the United States Patent and Trademark Office*